United States Patent
Hurst

[11] 3,893,562
[45] July 8, 1975

[54] ROTATABLE APPARATUS FOR TRANSFERRING ARTICLES

[75] Inventor: Robert L. Hurst, Muncie, Ind.

[73] Assignee: Ball Corporation, Muncie, Ind.

[22] Filed: Dec. 20, 1972

[21] Appl. No.: 316,956

Related U.S. Application Data

[62] Division of Ser. No. 99,405, Dec. 18, 1970, Pat. No. 3,712,453, which is a division of Ser. No. 784,845, Dec. 18, 1968, Pat. No. 3,641,959.

[52] U.S. Cl............. 198/25; 198/41; 214/1 BC
[51] Int. Cl............................................. B65g 47/06
[58] Field of Search...... 198/41, 103, 25; 214/1 BH, 214/1 BC

[56] References Cited
UNITED STATES PATENTS
2,904,161  9/1959  Schrieber.............................. 198/25
3,175,702  3/1965  Banyas................................ 198/25

Primary Examiner—James B. Marbert
Assistant Examiner—Richard K. Thomson
Attorney, Agent, or Firm—James D. Haynes

[57] ABSTRACT

Completely automatic system for handling articles such as metal discs for closures of the two-piece type wherein radial arms on a carousel travel in a circle to pick up lids sequentially by magnetism or vacuum from a coating table and transfer them to a moving conveyor.

2 Claims, 9 Drawing Figures

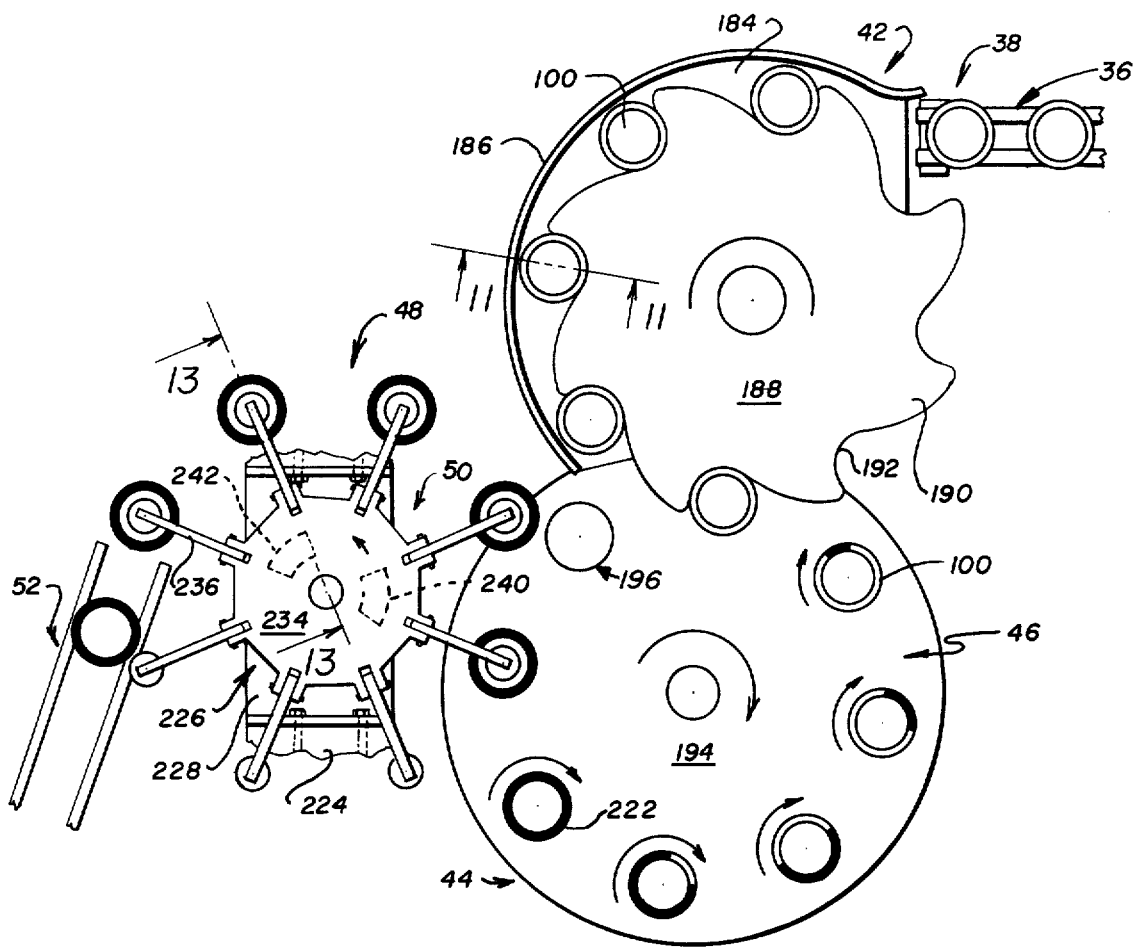
FIG. 2
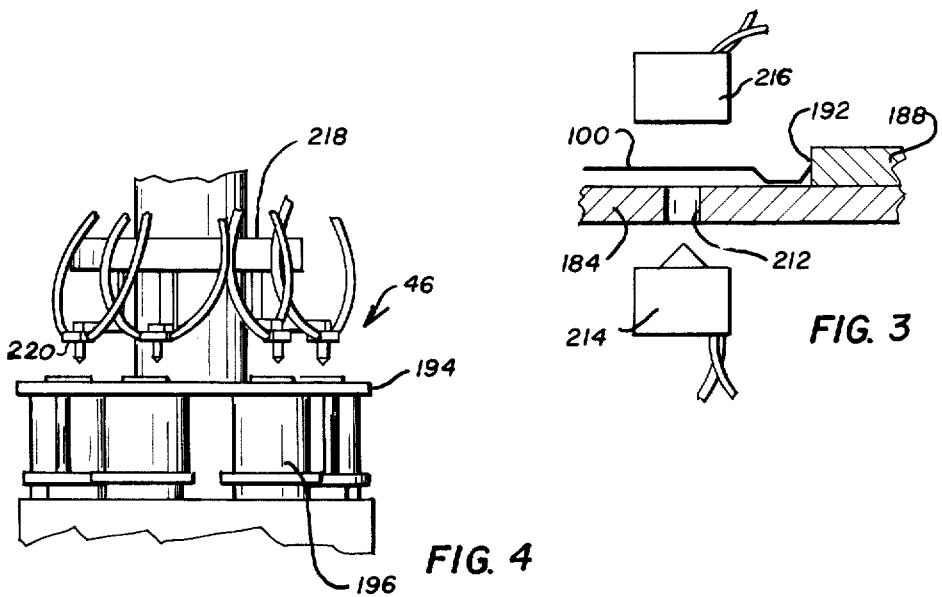
FIG. 3
FIG. 4

ROTATABLE APPARATUS FOR TRANSFERRING ARTICLES

CROSS REFERENCE TO RELATED APPLICATION

This application is a Division of my copending application Ser. No. 99,405, filed Dec. 18, 1970 and entitled "Apparatus For Transferring Articles", (now U.S. Pat. No. 3,712,453, issued Jan. 23, 1973) which application was a Division of my then copending application Ser. No. 784,845, filed Dec. 18, 1968 entitled "Method and Apparatus For Producing Closures" (now U.S. Pat. No. 3,641,959, issued Feb. 15, 1972).

BACKGROUND OF THE INVENTION

Glass jars have been used for many years for the purpose of home canning of fruits and vegetables, and many types of closures have been evolved for sealing such jars. Of the many early types, Putman's "Lightning Jar", which utilized a glass cover plate, the margin of which pressed an annular rubber gasket against the margin of the jar mouth with the cover plate held tight by a toggle operated bail, and Mason's screw threaded jar fitted with a zinc cap having mating threads on the flange to hold rubber gasket material against the jar to form a top seal, were particular popular.

Subsequently, two-piece closures were developed comprising a disc type lid having a concave margin to seat on the margin of the jar mouth, the concave margin being coated with a gasket material formed in place such as cured latex and, more recently, plastisol, the lid being clamped in place by a flanged and threaded band which engaged corresponding threads on the jar mouth and the periphery of the lid. The two-piece closure has come into widespread use because the bands may be used repeatedly so that only the lids need be replaced for each new use.

Prior practice in the manufacture of the lids has been rather inefficient and relatively costly because of a large amount of manual handling, which also results in lower production than might otherwise be realized for effort expended. The lids are very thin and may be easily deformed. Moreover, they are commonly treated on the sealing face to prevent corrosion by the contents of a jar and it is essential to avoid scratching the protective coating which would render them unusable. It has been common after each operation to place, stack, the lids in a storage bin. They then have to be sorted out and fed uniformly into the next operating stage. When gasket material to be formed in place is applied to the concave marginal seat, it is in viscous form but still quite subject to running or spreading if the lid is tilted or jarred laterally while it is travelling to a curing station. A large proportion of two-piece closures have been assembled by hand, and this, too, has proved to be cumbersome as well as expensive.

SUMMARY OF THE INVENTION

The present invention overcomes the difficulties mentioned above and provides a system for handling articles rotating on a processing table. The articles are removed from the table in a manner as to prevent damage and to facilitate rapid production rates without adversely affecting uniformity or quality of product. The overall system of which this invention is a part is disclosed in U.S. Pat. No. 3,641,959 of which this application is a division.

Lids are fed onto a coating table at selected intervals along its periphery. As the lids travel through a horizontal arc, a series of pouring spouts apply a coating of sealing material, which may be latex, but preferably a selected plastisol, to the margin of each lid in the concave seat.

A carousel, of this invention, is located adjacent to the coating table and includes a standard mounted for rotation about a vertical axis and a plurality of radial arms. Each arm has a pickup device, which may be magnetic or vacuum, at its outer end to pick up a lid from a station of the coating table. The carousel is so located and operated at such a rate that the pickup devices pass over a selected point on the peripheral path of travel of the coating stations at the same time as one of the coating stations reaches that point, and each pickup device picks up one lid and swings it through an arc to deposit it on the upper pass of the adjacent end of a belt type conveyor.

BRIEF DESCRIPTION OF THE DRAWINGS

Various other advantages and features of novelty will become apparent as the description proceeds in conjunction with the accompanying drawings, in which:

FIG. 2 is a plan view of the infeed disc, the coating table, and the carousel for removing lids from the coating table;

FIG. 3 is a sectional view taken on line 11—11 of FIG. 10;

FIG. 4 is an elevational view of the coating means for applying sealing material to lids carried on the coating table of FIG. 10;

DESCRIPTION OF PREFERRED EMBODIMENTS

Figure 1:
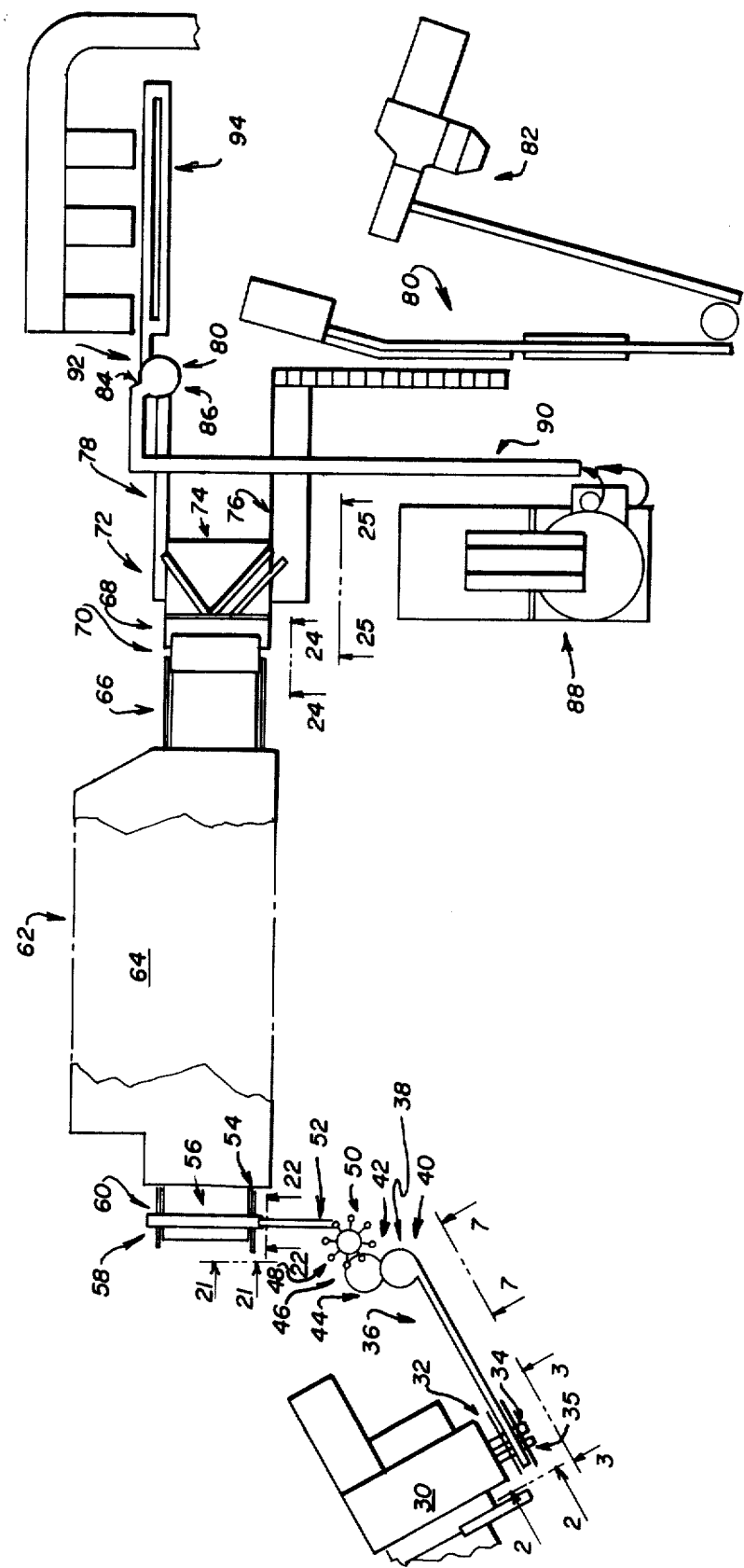
FIG. 1 is a schematic view, in plan form, showing the various parts of an apparatus constructed in accordance with the invention.

The total apparatus for the practice of the invention is schematically illustrated in FIG. 1, where a stamping and forming machine 30 operates continuously to stamp discs from sheet stock and form them into closure lids by producing a concave sealing margin around the entire periphery of the lid, which margin is coated with a thin layer of sealing material, which may be latex or a plastisol, the latter being presently preferred. The plastisol is subsequently cured in an oven to a rubberlike consistency and is adapted to make sealing contact with the mouth of a typical Mason-type jar in use.

The machine 30 sequentially supplies lids with their first, or sealing, face down to a first conveyor 32. The conveyor then sequentially delivers the lids to a first transfer zone 34, where inverter means 35 inverts the lids and moves them onward. The inverter means includes the delivery end of a second conveyor 36. By the use of magnetic means to be later described, the lids are sequentially transferred to the second conveyor with their second faces in contact with the conveyor belt, and are held in contact with the belt while it passes around an end loop pulley, with the result that the lids now travel along the upper pass of the second conveyor with their first faces up.

The second conveyor now delivers the lids sequentially to a second transfer zone 38 where an automatically controlled stop means 40 allows them to pass individually to a second transfer means 42 including a star wheel which feeds the lids sequentially into a first treating zone 44 and onto a coating machine 46. The latter applies the plastisol coating to the concave marginal seat of each lid as they move through the treating zone to the third transfer zone 48. A third transfer means in the form of a carousel 50 picks up each lid and moves it to the adjacent receiving end of a third conveyor 52.

Conveyor 52 moves the lids sequentially to a fourth transfer zone 54, where a fourth conveyor 56 picks them up from the third conveyor and delivers them to a fifth transfer zone 58 and deposits them on a fifth conveyor 60. The latter is provided with a belt much wider than those of the previous conveyors and it is arranged to travel in a direction perpendicular to the path of travel of the fourth conveyor. The delivery end of conveyor 56 overlies the entire width of the receiving end of conveyor 60 and is arranged to simultaneously deposit a plurality of lids on conveyor 60 in a row transverse to the path of travel of conveyor 60. This operation is repeated successively so that conveyor 60 continuously receives such transverse rows.

Conveyor 60 moves the rows of lids onward to a second treating zone 62 where they pass through a curing station 64 and on to a sixth transfer zone 66, where they are transferred to a sixth conveyor 68 with the aid of a seventh conveyor 70 overlying the adjacent ends of conveyors 60 and 68. Conveyor 68 moves the rows of lids onward to a seventh transfer zone 72, and at this zone a diverter 74 intercepts the rows and realigns them to travel diagonally in single file onto the receiving end of an eighth conveyor 76. Alternatively, the diverter 74 may be arranged to divide the rows and send a portion of each to a ninth conveyor 78.

Those lids which are deposited on conveyor 76 travel onward to an assembly zone 80 where they are arranged in sets, such as a dozen or a half dozen, and placed in boxes. The boxes then move on to a packaging station 82 where they are packed in larger carton ready for shipping.

Those lids which are deposited on conveyor 78 travel onward to a second assembly zone 84 where they are fed sequentially into an assembly machine 86. Flanged closure bands from a source of supply 88 are deposited on a tenth conveyor 90 which delivers them to assembly zone 84 and feeds them sequentially into assembly machine 86. The machine aligns sets of one lid and one band in registry, seats each lid in its band and deposits them on eleventh conveyor 92 which delivers them to second packaging zone 94 to be packed and shipped.

Referring to FIGS. 1 and 2–4, the apparatus and operations in the first treating zone will now be described. The transfer means 42 includes an arcuate plate 184 having an upstanding guide flange 186, on which is mounted for rotation on a vertical axis star wheel 188 having a series of evenly peripherally spaced arms 190 defining between them notches 192 to receive and move individual lids 100. The lids are guided between the notches and flange 186 to be sequentially delivered to coating table 194. The table also rotates about a vertical axis and is provided with evenly peripherally spaced coating stations 196, each adapted to receive and carry one lid through the coating operation. The movements of the star wheel and coating table are coordinated so that each lid will be deposited in exact registry with its respective coating station.

In the event that the previous feed mechanism fails to supply a lid to any one of notches 192 in the star wheel the result would be an empty coating station, and it would be necessary to stop the coating operation to avoid depositing coating material directly on a coating station which would then have to be cleaned out before operations could continue. Accordingly, an emergency control system is provided as illustrated in FIGS. 2 and 3. An aperture 212 is provided in plate 184 and a light source 214 and photocell 216 are vertically aligned with it. The aperture is so located that it will be covered by each arm 190 and uncovered by each notch 192. If a lid is properly in place in each notch as indicated in FIG. 3, no light will reach photocell 216 and it will not be actuated. However, if a lid is absent, light will reach photocell 216 and it will transmit a signal to stop the coating operation.

As previously stated, the star wheel 188 is coordinated with table 194 so that it deposits lids one at a time to the coating stations 196, the upper surface of each station being disposed slightly below the surface of plate 184 to facilitate transfer. Each lid is secured against the upper surface of its respective station by suitable means, not shown, such as a magnet or a source of reduced pressure. Each coating station is mounted in an opening in table 194 for rotation about its own axis and means are provided for causing such rotation at a rate which will cause a full revolution while the table is passing through a partial rotation.

A support ring 218 is mounted directly above table 194 and fixed thereto so that it rotates with the table at the same rate of speed. Mounted on ring 218 are a plurality of spray nozzles 220, one for each coating station, and they are located so that the tip of each nozzle is directly above the margin of one of the stations. They are controlled to discharge sealing material during about one half of each revolution of the table, commencing shortly after a lid is deposited on a station. Since the lids are secured to the stations, they will each make a full revolution about their own vertical axis during the time their respective nozzles are in operation. As a result, each will receive a full annular coating 222 of sealing material in their concave seats which is later to serve as a gasket. Following the application of the sealing material, continued rotation of the coating table sequentially brings each lid to a point adjacent to the third transfer zone, and the means for securing them against the coating stations are released.

Referring to FIGS. 1, 2 and 5 to 8, the construction and operation of the transfer means 50 for removing lids from the coating table, carrying them through the transfer zone 48, and delivering them to conveyor 52 will now be described. Transfer means 50 comprises a support 224 and a carousel 226 mounted on the support for rotation about a vertical axis. A base plate 228 is fixedly attached to support 224 and provided with a central opening 230 through which extends rotatable drive shaft 232. The carousel includes a rotor plate 234 to which a series of radially extending pickup arms 236 are attached by means of pivot pins 238 to provide individual movement of each arm in a vertical plane.

Mounted on base plate 228 are cams 240 and 242, each adapted to be engaged by a cam follower 244 on each arm 236 once in each revolution to cause raising of the inner end and lowering of the outer end of each arm. The arms are normally held in a position with their outer ends raised by a spring 246 compressed between a boss 248 and the under side of rotor plate 234.

Figure 5:
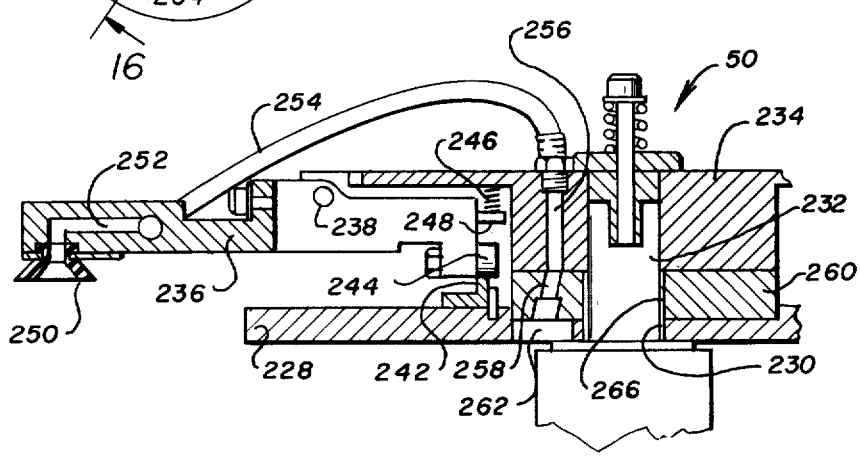
FIG. 5 is a sectional view taken on line 13—13 of FIG. 10.

As seen in FIG. 5, the outer end of each arm 236 is provided with a pickup device in the form of a conically shaped flexible suction cup 250. The cup is in communication with a passageway 252 formed in the arm. The passageway is in turn disposed in communication with a flexible air line or tube 254. The flexible tube is disposed in communication with a passageway 256 formed in rotor plate 234 and intermittently in communication with a passageway 258 formed in bearing plate 260 and an aperture 262 formed in base plate 228, the latter aperture being open to ambient pressure.

Figure 8:
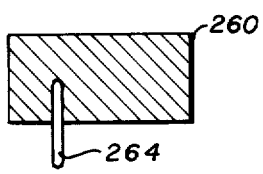
FIG. 8 is a sectional view taken on line 16—16 of FIG. 15.

Bearing plate 260 is securely attached to base plate 228 by means of pin 264, shown in FIG. 8, to prevent relative rotation and misalignment of passageway 258 and aperture 262, and also is provided with a central opening 266 to allow passage and rotation of drive shaft 232. Plate 260 is also provided with an aperture 268 adapted to be placed in intermittent communication with passageway 256 of member 234. Aperture 268 is connected to a source of reduced pressure, not shown. As may be seen in FIG. 7, the apertures 258 and 268 are circumferentially spaced from each other by approximately 165°.

Referring now to FIGS. 2, 5 and 8, the operation of the carousel transfer means 50 will now be described. As the cam follower 244 of one of the arms 236 engages the leading edge of the cam 240, the inner end of the arm is raised against the pressure of spring 246 and the outer end is lowered. As the suction cup 250 engages a portion of the lid disposed on the station 196 which is momentarily at the point of contact of the paths of travel of the pickup devices and the stations, the interior of the suction cup is disposed in communication with a source of reduced pressure, and the cup picks up the lid and holds it securely.

As arm 236 continues to rotate about a vertical axis, the cam follower 244 moves out of contact with cam 242, permitting the outer end of the arm and its pickup device to move upwardly by a predetermined amount. As arm 236 continues to rotate, its cam follower 244 comes into contact with cam 242, thereby once again causing arm 236 to move about its pivot 238 until its outer end and the pickup device 250 move downwardly a predetermined amount. When the arm has rotated approximately 165°, the interior of the suction cup is disposed in communication with ambient pressure by way of passageways 256, 258, and 262, and the suction cup releases the lid onto the adjacent end of conveyor 52. Continued rotation of arm 236 results in disengagement of its cam follower 244 from cam 242, and the suction cup 250 moves upwardly and away from the lid. It will be understood that a good sealing contact must be maintained between the arm 234 and bearing plate 260 during the 165 degree travel in order to maintain the vacuum produced at the suction cup 250 until it reaches the point of deposit of the lid on conveyor 52.

Figure 6:
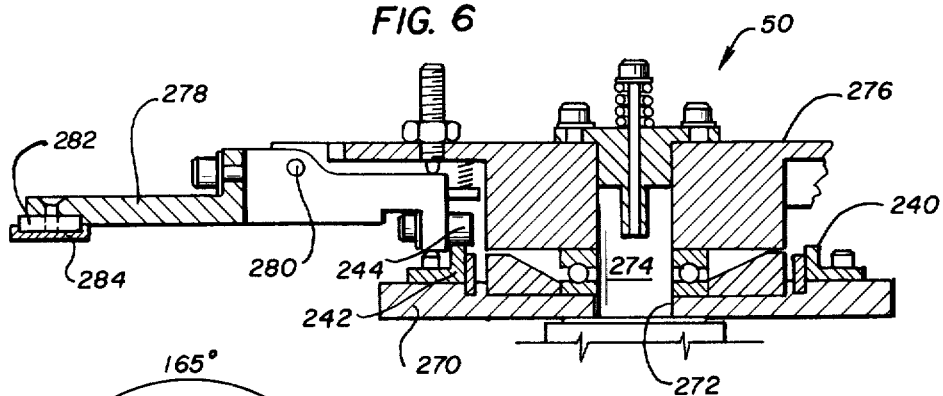
FIG. 6 is a view similar to FIG 13 showing a modified form of pickup device.
Figure 7:
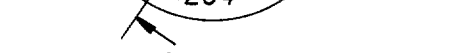
FIG. 7 is a schematic plan view of one of the rotor plates shown in FIG. 13.

A variant of the carousel 226 is illustrated in FIG. 6. In this form, a base plate 270 is provided with an opening 272 for passage of rotatable drive shaft 274 secured to rotor plate 276 at its upper end. Cams 240 and 242 are secured to the base plate in the same locations. Pickup arms 278 are pivoted to rotor plate 276 by pins 280 as before and carry cam followers 244 to cause lowering of the outer ends of the arms at the same points in their rotation. In this case the suction cups are replaced by magnets 282 secured to the outer ends of arms 278. Each magnet is provided on its lower face with a layer 284 of material which is non-magnetic and has a low coefficient of friction, such as a plastic material. The carousel operates in the same way as in the previous from except that the pickup device lifts the lids by means of the magnetic field created by magnet 282. When magnet 282 overlies the adjacent end of conveyor 52 the lid is released and drawn down onto the conveyor by means of another magnet, later described, which overcomes the force of magnet 282. A passage 286 extends through the end of arm 278, the magnet 282, and the coating 284 to eliminate any suction effect which might hinder withdrawal of the lid.

Bearing in mind the fact that, although the plastisol used as the sealing material is considered as a viscous material, it can flow on the upper surface of the lid if the latter is subjected to any sudden movements or vibrations. Thus, it is necessary to reduce disturbance to a minimum until the lids reach the curing station. For this reason the apparatus described above is arranged and coordinated so that, at the pickup point in FIG. 2, the circular paths of travel of the pickup devices and the coating stations are "tangent", and the pickup devices and stations are traveling in the same direction at the same speed. Also at the point of deposit on conveyor 52, the pickup device is traveling at the same speed and in the same direction as the conveyor belt. Thus there are no abrupt changes of direction or speed to disturb the flowable sealing material.

Figure 9:
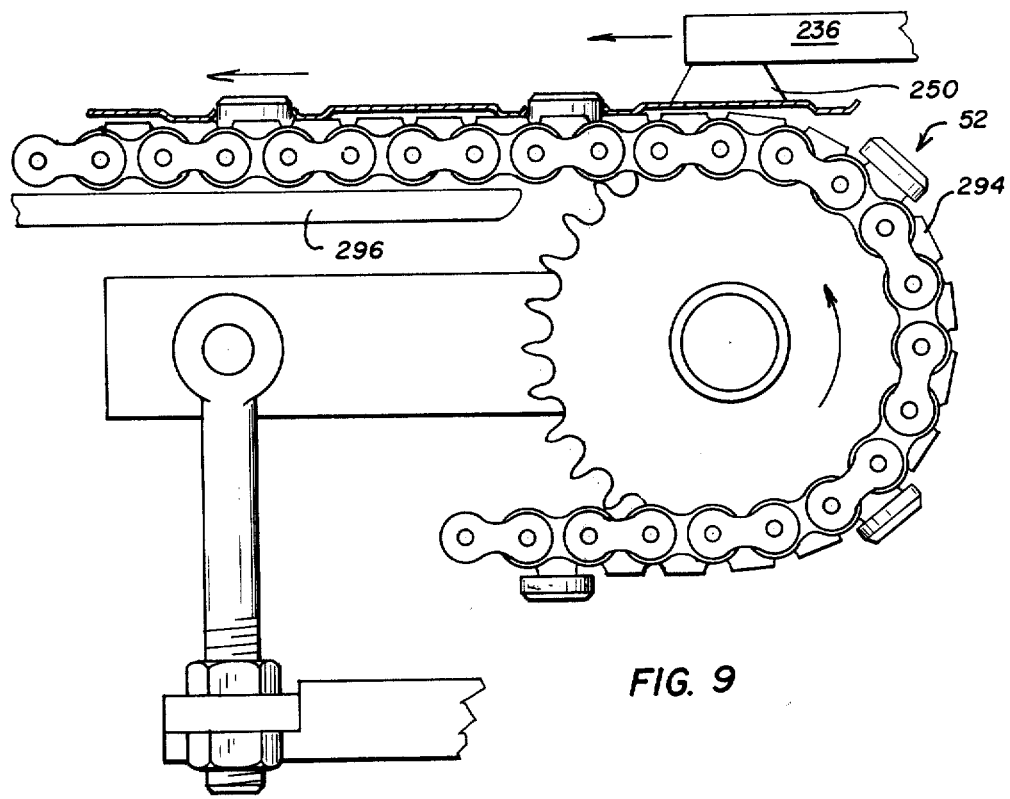
FIG. 9 is a side elevational view of a portion of the conveyor shown in FIG. 10.

An elongate bar magnet 296 is arranged to closely underlie the belt and extends from the end shown in FIG. 9 to a point somewhat short of the delivery end of the conveyor. When the pickup device 250 releases a lid it is pulled down into seating engagement on the tabs 294. In the case of the magnetic pickup device 282, the magnet 296 is considerably stronger and pulls the lid away from the pickup device. During their course of travel on the conveyor, the lids are held securely on the belt by the field of magnet 296 and therefore they are subject to minimum disturbance.

It will be apparent to those skilled in the art that various changes may be made in the construction and operation of the system disclosed without departing from the spirit of the invention, and it is intended that all such changes shall be embraced within the scope of the following claims.

What is claimed is:

1. Apparatus for sequentially removing plate-like articles from the processing stations of a processing table rotating about a vertical axis and transferring them to the adjacent end of a conveyor, comprising: a support positioned between the table and the conveyor; a standard mounted on said support for rotation about a vertical axis; a plurality of arms extending radially outward from said standard in a generally horizontal plane; means at the outer free end of each arm adapted to engage and lift and article vertically from an underlying processing station, said means comprising a magnet to attract an article as the magnet overlies a processing station and to support the article during arcuate travel to the adjacent end of the conveyor and means to create a magnetic field to remove said article from said magnet for deposit on the conveyor; each arm being of such length that its article engaging means will directly overlie a processing station at one point in its rotation and will overlie the adjacent end of the conveyor at another point in its rotation; and means to cause continuous sequential transfer of articles from the processing table to the conveyor.

2. Apparatus as claimed in claim 1; and a conveyor having one end underlying a selected point in the path of travel of said article engaging means; said conveyor being provided with an endless loop type belt, the upper pass of which is adapted to receive articles from said article engaging means and carry them onward; and a magnet underlying the upper pass of said conveyor to draw successive articles from the successive overlying arm magnets down onto the belt and to restrain the articles against movement relative to the belt during conveyance.

* * * * *